United States Patent
Hochwarth et al.

(10) Patent No.: US 7,921,208 B2
(45) Date of Patent: Apr. 5, 2011

(54) NETWORK TIME OUT HANDLING

(75) Inventors: Christian Hochwarth, Wiesloch (DE);
Andreas S. Krebs, Karlsruhe (DE);
Martin Erhard, Karlsruhe (DE);
Marcus Philipp, Dielheim (DE)

(73) Assignee: SAP Aktiengesellschaft, Walldorf (DE)

( * ) Notice: Subject to any disclaimer, the term of this patent is extended or adjusted under 35 U.S.C. 154(b) by 946 days.

(21) Appl. No.: 11/258,519

(22) Filed: Oct. 24, 2005

(65) Prior Publication Data
US 2007/0115845 A1    May 24, 2007

(51) Int. Cl.
*G06F 15/173* (2006.01)

(52) U.S. Cl. ........ 709/225; 709/227; 709/228; 709/229; 709/223; 709/224; 709/203

(58) Field of Classification Search .................. 709/203, 709/217, 219, 223, 224, 225, 227, 228
See application file for complete search history.

(56) References Cited

U.S. PATENT DOCUMENTS

| | | | |
|---|---|---|---|
| 6,446,144 | B1 | 9/2002 | Habusha et al. |
| 6,446,225 | B1 | 9/2002 | Robsman et al. |
| 6,687,859 | B2 | 2/2004 | Robsman et al. |
| 6,738,373 | B2 | 5/2004 | Turner |
| 2003/0088677 | A1 | 5/2003 | Yamamoto |
| 2003/0132958 | A1 | 7/2003 | Himmel et al. |
| 2003/0158959 | A1 | 8/2003 | Jayapalan et al. |
| 2004/0068572 | A1* | 4/2004 | Wu ................. 709/229 |
| 2004/0249921 | A1 | 12/2004 | Yamamoto |
| 2005/0044240 | A1 | 2/2005 | DePree |
| 2005/0114712 | A1 | 5/2005 | Devine et al. |
| 2005/0198397 | A1 | 9/2005 | Park |
| 2006/0020707 | A1* | 1/2006 | Undery et al. ........... 709/230 |
| 2006/0123119 | A1* | 6/2006 | Hill et al. ................ 709/227 |
| 2006/0271684 | A1* | 11/2006 | Booth et al. ............. 709/227 |
| 2007/0008937 | A1* | 1/2007 | Mody et al. .............. 370/338 |

FOREIGN PATENT DOCUMENTS

| | | |
|---|---|---|
| WO | WO99/05612 | 2/1999 |
| WO | WO2005/020537 A1 | 3/2005 |

OTHER PUBLICATIONS

Search Report issued in international application No. EP 06121939.0—2413 issued on Feb. 2, 2007, 6 pages.
Communication pursuant to Article 94(3) EPC issued in international application No. EP 06121939.0—2413 issued on Nov. 18, 2008, 3 pages.

* cited by examiner

*Primary Examiner* — Barbara N Burgess
(74) *Attorney, Agent, or Firm* — Fish & Richardson P.C.

(57) ABSTRACT

An example method for time-out handling comprises establishing a session from a network-based application at a client to a web server. The method includes identifying a time-out parameter for the web server. A timestamp of the established session is saved at the client. The method also includes determining a first time-out by adding the identified time-out parameter to the timestamp and triggering a system-based communication from the network-based application to keep the session alive. The method may be implemented by a client of a learning management system.

15 Claims, 6 Drawing Sheets

NETWORK TIME OUT HANDLING

TECHNICAL FIELD

The present disclosure relates to networking and, more particularly, handling time-outs across one or more networks.

BACKGROUND

Today, an enterprise's survival in local or global markets at least partially depends on the knowledge and competencies of its employees, which may easily be considered a competitive factor for the enterprises (or other organizations). Shorter product life cycles and the speed with which the enterprise can react to changing market requirements are often important factors in competition and ones that underline the importance of being able to convey information on products and services to employees as swiftly as possible. Moreover, enterprise globalization and the resulting international competitive pressure are making rapid global knowledge transfer even more significant. Thus, enterprises are often faced with the challenge of lifelong learning to train a (perhaps globally) distributed workforce, update partners and suppliers about new products and developments, educate apprentices or new hires, or set up new markets. In other words, efficient and targeted learning is a challenge that learners, employees, and employers are equally faced with. But traditional classroom training typically ties up time and resources, takes employees away from their day-to-day tasks, and drives up expenses.

Accordingly, the enterprise may implement an electronic learning management system. The presentation of the user interface may be via a web browser (or other network-based application). Typically, there is no constant connection between the user interface and the server application because of the use of connectionless protocols. In this case, when a learner starts an example learning courses, the web server creates a server side session that holds the context information. While working through the learning content, the learner often clicks on a user interface element that triggers browser-server communication, which updates the server side session. But if no client-server communication occurs for a particular time span (usually 30 minutes) the server side session is terminated and the context removed. Occasionally, users that are still using the user interface may not be informed of this session removal and, therefore, may believe that they are still accessing a running or existing session. When this happens, the particular user must do something that triggers browser-server communication to indicate session time out error. Returning to the example electronic learning courses, certain activities (such as taking tests, reading content, etc.) may easily take longer than the server time out allows. In this case, the activity (test) results are lost because of the loss of server side context information.

SUMMARY

This disclosure generally describes systems, methods, and software for time out handling. In one embodiment, the method for time-out handling comprises identifying a time-out parameter at a web server. The method includes establishing a session from a network-based application at a client to the web server. A timestamp of the established session is stored at the client. The method also includes determining a first time-out by adding the identified time-out parameter to the timestamp and triggering a system-based communication from the network-based application to keep the session alive. In certain (but not all) embodiments, such time-out handling may be implemented in enterprises. In further embodiments, the enterprises may incorporate or use these time-out handling aspects to better provide electronic learning.

The details of one or more embodiments are set forth in the accompanying drawings and the description below. Features, aspects, and advantages will be apparent from the description, drawings, and claims.

DETAILED DESCRIPTION

Figure 1:
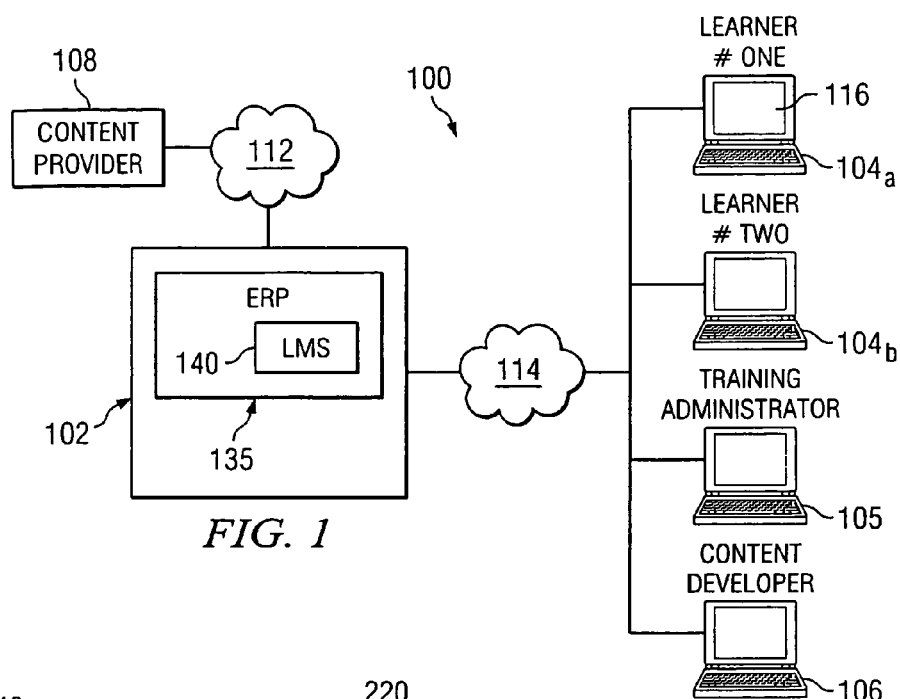
FIG. 1 is a diagram illustrating an example learning environment according to one embodiment of the present disclosure.

FIG. 1 illustrates an example environment 100 for implementing time-out handling in the context of a learning management system 140. Typically, at least a portion of system 100 is a client-side application interface, a browser, or other network-based application and another local or remote portion of environment 100 is a server. In this example, the user interface can determine the time span that the server generally allows between two browser(client)-server communications. At a high level, each time a browser-server communication occurs, the client-side interface (or an associated or referenced application program interface (API)) saves (or stores or populates a data structure with) the time stamp of this action and starts a logical timer. This timer monitors for additional communications and checks, before the maximum idle time, if the time stamp has been renewed. In this case, the timer will check again shortly before the time-out of the renewed time stamp occurs and so on. But if the time stamp has not been renewed and the session nears time out, the user interface generates or presents a pop up window asking the user for confirmation of usage. If the user confirms before the actual server time out occurs, then the user interface triggers an action (often an otherwise useless or harmless browser-server communication) to keep the session alive. In another alternate or complementary embodiment, the user interface may not use the example pop up window for confirmation, but may instead automatically trigger a browser-server communication if the time stamp has not been renewed. This embodiment generally keeps sessions alive as long as the browser window is open or the server is being stopped, shut down, or otherwise non-communicative.

Learning management system 140 may deliver a blended learning solution of learning methods used in traditional classroom training, web-based training, and virtual classrooms. At a high level, such applications 140 provide convenient information on the learner 104's virtual workplace and at least partially control the learning process itself. The system proposes learning units based on the learner 104's personal data, tracks progress through courses and coordinates the personalized learning experience. In addition, learning management system 140 encompasses the administrative side of the learning platform, where a training administrator 105 structures and updates the offering and distributes it among the target groups. Moreover, the course offering is usually not restricted to internally hosted content. The learning management system 140 often offers robust reporting capabilities, including ad hoc reporting and business intelligence. These capabilities may provide in-depth analysis of the entire business or organization, thereby enabling better decision making. Learning management system 140 also typically helps improve the quality of training and cut costs by reducing the travel and administrative costs associated with classroom training while delivering a consistent learning offering. Training administrators 105 may customize teaching scenarios by using web services to integrate external content, functions, and services into the learning platform from a remote or third party content provider 108.

The training administrator 105 can administer internal and external participants (or learners 104) and enroll them for courses to be delivered via any number of techniques. Training management supports the respective organization, entity, or learner 104 in the day-to-day activities associated with course bookings. Booking activities can be performed by the training administrator in training management on an individual or group participant basis. For example, training administrator 105 can often request, execute, or otherwise manage the following activities in a dynamic participation menu presented in learning management system 140: i) prebook: if participants are interested in taking certain classroom courses or virtual classroom sessions, but there are no suitable dates scheduled, learners 104 can be prebooked for the course types. Prebooking data can be used to support a demand planning process; ii) book: individual or group learners 104 (for example, companies, departments, roles, or other organizational units) can be enrolled for courses that can be delivered using many technologies; iii) rebook: learners 104 can book a course on an earlier or later date than originally booked; iv) replace: learners 104 can be swapped; and v) cancel: course bookings can be canceled, for example, if the learners 104 cannot attend.

Environment 100 is typically a distributed client/server system that spans one or more networks such as external network 112 or internal network 114. In such embodiments, data may be communicated or stored in an encrypted format such as, for example, using the RSA, WEP, or DES encryption algorithms. But environment 100 may be in a dedicated enterprise environment—across a local area network or sub-net—or any other suitable environment without departing from the scope of this disclosure. Indeed, while generally described or referenced in terms of an enterprise, the components and techniques may be implemented in any suitable environment, organization, entity, and such. Turning to the illustrated embodiment, environment 100 includes or is communicably coupled with server 102, one or more learners 104 or other users on clients, and network 112. In this embodiment, environment 100 is also communicably coupled with external content provider 108.

Server 102 comprises an electronic computing device operable to receive, transmit, process and store data associated with environment 100. Generally, FIG. 1 provides merely one example of computers that may be used with the disclosure. Each computer is generally intended to encompass any suitable processing device. For example, although FIG. 1 illustrates one server 102 that may be used with the disclosure, environment 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server. Server 102 may also be communicably coupled with a remote repository over a portion of network 112. While not illustrated, the repository may be any intra-enterprise, inter-enterprise, regional, nationwide, or other electronic storage facility, data processing center, or archive that allows for one or a plurality of clients (as well as servers 102) to dynamically store data elements, which may include any business, enterprise, application or other transaction data. For example, the repository may be a central database communicably coupled with one or more servers 102 and clients via a virtual private network (VPN), SSH (Secure Shell) tunnel, or other secure network connection. This repository may be physically or logically located at any appropriate location including in one of the example enterprises or off-shore, so long as it remains operable to store information associated with environment 100 and communicate such data to at least a subset of plurality of the clients (perhaps via server 102).

As a possible supplement to or as a portion of this repository, server 102 normally includes some form of local memory. The memory may include any memory or database module and may take the form of volatile or non-volatile memory including, without limitation, magnetic media, optical media, random access memory (RAM), read-only memory (ROM), removable media, or any other suitable local or remote memory component. For example, the memory may store or reference a large volume of information relevant to the planning, management, and follow-up of courses or other content. This example data includes information on i) course details, such as catalog information, dates, prices, capacity, time schedules, assignment of course content, and completion times; ii) personnel resources, such as trainers who are qualified to hold courses; iii) room details, such as addresses, capacity, and equipment; and iv) participant data for internal and external participants. The memory may also include any other appropriate data such as VPN applications or services, firewall policies, a security or access log, print or other reporting files, HTML files or templates, data classes or object interfaces, child software applications or sub-systems, and others. In some embodiments, the memory may store information as one or more tables in a relational database described in terms of SQL statements or scripts. In another embodiment, the memory may store information as various data structures in text files, eXtensible Markup Language (XML) documents, Virtual Storage Access Method (VSAM) files, flat files, Btrieve files, comma-separated-value (CSV) files, internal variables, or one or more libraries. But any stored information may comprise one table or file or a plurality of tables or files stored on one computer or across a plurality of computers in any appropriate format. Indeed, some or all of the learning or content data may be local or remote without departing from the scope of this disclosure and store any type of appropriate data.

Server 102 also includes one or more processors. Each processor executes instructions and manipulates data to perform the operations of server 102 such as, for example, a central processing unit (CPU), a blade, an application specific integrated circuit (ASIC), or a field-programmable gate array (FPGA). Although this disclosure typically discusses computers in terms of a single processor, multiple processors may be used according to particular needs and reference to one processor is meant to include multiple processors where applicable. In the illustrated embodiment, the processor executes enterprise resource planning (ERP) solution 135, thereby providing organizations with the strategic insight, ability to differentiate, increased productivity, and flexibility they need to succeed. With software such as ERP solution 135, the implementing entity may automate end-to-end processes and extend those processes beyond the particular organization to the entire system by incorporating customers, partners, suppliers, or other entities. For example, ERP solution 135 may include or implement easy-to-use self-services and role-based access to information and services for certain users, thereby possibly boosting productivity and efficiency. In another example, ERP solution 135 may include or implement analytics that enable the particular entity or user to evaluate performance and analyze operations, workforce, and financials on an entity and individual level for strategic and operational insight. ERP solution 135 may further include or implement i) financials to control corporate finance functions while providing support for compliance to rigorous regulatory mandates; ii) operations to support end-to-end logistics for complete business cycles and capabilities that improve product quality, costs, and time to market; and/or iii) corporate services to optimize both centralized and decentralized services for managing real estate, project portfolios, business travel, environment, health and safety, and quality. In the illustrated embodiment, ERP solution 135 also includes or implements some form of human capital management (in this case, learning) to maximize the profitability or other measurable potential of the users, with support for talent management, workforce deployment, and workforce process management. In certain cases, ERP solution 135 may be a composite application that includes, execute, or otherwise implement some or all of the foregoing aspects, which include learning management system 140 as illustrated.

As briefly described above, learning management system 140 is any software operable to provide a comprehensive enterprise learning platform capable of managing and integrating business and learning processes and supporting all methods of learning, not restricted to e-learning or classroom training. As described in more detail in FIG. 2, learning management system 140 is often fully integrated with ERP solution 135 and includes an intuitive learning portal and a powerful training and learning management system, as well as content authoring, structuring, and management capabilities. Learning management system 140 offers back-office functionality for competency management and comprehensive assessment for performance management, and offers strong analytical capabilities, including support for ad hoc reporting. The solution uses a comprehensive learning approach to deliver knowledge to all stakeholders, and tailors learning paths to an individual's educational needs and personal learning style. Interactive learning units can be created with a training simulation tool that is also available.

Regardless of the particular implementation, "software" may include software, firmware, wired or programmed hardware, or any combination thereof as appropriate. Indeed, ERP solution 135 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while ERP solution 135 is illustrated in FIG. 1 as including one sub-module learning management system 140, ERP solution 135 may include numerous other sub-modules or may instead be a single multi-tasked module that implements the various features and functionality through various objects, methods, or other processes. Further, while illustrated as internal to server 102, one or more processes associated with ERP solution 135 may be stored, referenced, or executed remotely. For example, a portion of ERP solution 135 may be a web service that is remotely called, while another portion of ERP solution 135 may be an interface object bundled for processing at the remote client. Moreover, ERP solution 135 and/or learning management system 140 may be a child or sub-module of another software module or enterprise application (not illustrated) without departing from the scope of this disclosure.

Server 102 may also include an interface for communicating with other computer systems, such as the clients, over networks, such as 112 or 114, in a client-server or other distributed environment. In certain embodiments, server 102 receives data from internal or external senders through the interface for storage in the memory and/or processing by the processor. Generally, the interface comprises logic encoded in software and/or hardware in a suitable combination and operable to communicate with networks 112 or 114. More specifically, the interface may comprise software supporting one or more communications protocols associated with communications network 112 or hardware operable to communicate physical signals.

Network 112 facilitates wireless or wireline communication between computer server 102 and any other local or remote computers, such as clients. Network 112, as well as network 114, facilitates wireless or wireline communication between computer server 102 and any other local or remote computer, such as local or remote clients or a remote content provider 108. While the following is a description of network 112, the description may also apply to network 114, where appropriate. For example, while illustrated as separate networks, network 112 and network 114 may be a continuous network logically divided into various sub-nets or virtual networks without departing from the scope of this disclosure. In some embodiments, network 112 includes access points that are responsible for brokering exchange of information between the clients. As discussed above, access points may comprise conventional access points, wireless security gateways, bridges, wireless switches, sensors, or any other suitable device operable to receive and/or transmit wireless signals. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. Turning to network 114, as illustrated, it may be all or a portion of an enterprise or secured network. In another example, network 114 may be a VPN between server 102 and a particular client across wireline or wireless links. In certain embodiments, network 114 may be a secure network associated with the enterprise and certain local or remote clients.

Each client is any computing device operable to connect or communicate with server 102 or other portions of the network using any communication link. At a high level, each client includes or executes at least GUI 116 and comprises an electronic computing device operable to receive, transmit, process and store any appropriate data associated with environment 100. It will be understood that there may be any number of clients communicably coupled to server 102. Further, "client" and "learner," "administrator," "developer" and "user" may be used interchangeably as appropriate without departing from the scope of this disclosure. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device or computer. For example, the client may be a PDA operable to wirelessly connect with external or unsecured network. In another example, the client may comprise a laptop that includes an input device, such as a keypad, touch screen, mouse, or other device that can accept information, and an output device that conveys information associated with the operation of server 102 or other clients, including digital data, visual information, or GUI 116. Both the input device and output device may include fixed or removable storage media such as a magnetic computer disk, CD-ROM, or other suitable media to both receive input from and provide output to users of the clients through the display, namely the client portion of GUI or application interface 116.

GUI 116 comprises a graphical user interface operable to allow the user of the client to interface with at least a portion of environment 100 for any suitable purpose, such as viewing application or other transaction data. Generally, GUI 116 provides the particular user with an efficient and user-friendly presentation of data provided by or communicated within environment 100. As shown in later FIGs, GUI 116 may comprise a plurality of customizable frames or views having interactive fields, pull-down lists, and buttons operated by the user. GUI 116 may be a learning interface allowing the user or learner 104 to search a course catalog, book and cancel course participation, and support individual course planning (e.g., by determining qualification deficits and displaying a learner's completed, started, and planned training activities). Learner 104 also may access and work through web based courses using the learning interface. The learning interface may be used to start a course, reenter a course, exit a course, and take tests. The learning interface also provides messages, notes, and special course offerings to the learner 104. GUI 116 may also be a course editor allowing the content developer to create the structure for the course content, which may be associated with certain metadata. The metadata may be interpreted by a content player of learning management system 140 (described below) to present a course to learner 104 according to a learning strategy selected at run time. In particular, the course editor may enable the author or content developer 106 to classify and describe structural elements, assign attributes to structural elements, assign relations between structural elements, and build a subject-taxonomic course structure. The course editor generates the structure of the course and may include a menu bar, a button bar, a course overview, a dialog box, and work space. The menu bar may include various drop-down menus, such as, for example, file, edit, tools, options, and help. The drop-down menus may include functions, such as create a new course, open an existing course, edit a course, or save a course. The button bar may include a number of buttons. The buttons may be shortcuts to functions in the drop down menus that are used frequently and that activate tools and functions for use with the course editor. The remaining portions of the example course editor interface may be divided in to three primary sections or windows: a course overview, a dialog box, and a workspace. Each of the sections may be provided with horizontal or vertical scroll bars or other means allowing the windows to be sized to fit on different displays while providing access to elements that may not appear in the window.

GUI 116 may also present a plurality of portals or dashboards. For example, GUI 116 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by presentation elements 140. GUI 116 is often configurable, supporting a combination of tables and graphs (bar, line, pie, status dials, etc.), and is able to build real-time dashboards, where presentation elements 140 (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 116 may indicate a reference to the front-end or other component of learning management system 140, as well as the particular interface or learning portal accessible via the client, as appropriate, without departing from the scope of this disclosure. In short, GUI 116 contemplates any graphical user interface, such as a generic web browser or touch screen, that processes information in environment 100 and efficiently presents the results to the user. Server 102 can accept data from the client via the web browser (e.g., Microsoft Internet Explorer or Netscape Navigator) and return the appropriate HTML or XML responses to the browser using network 112 or 114, such as those illustrated in subsequent FIGs.

Figure 2:
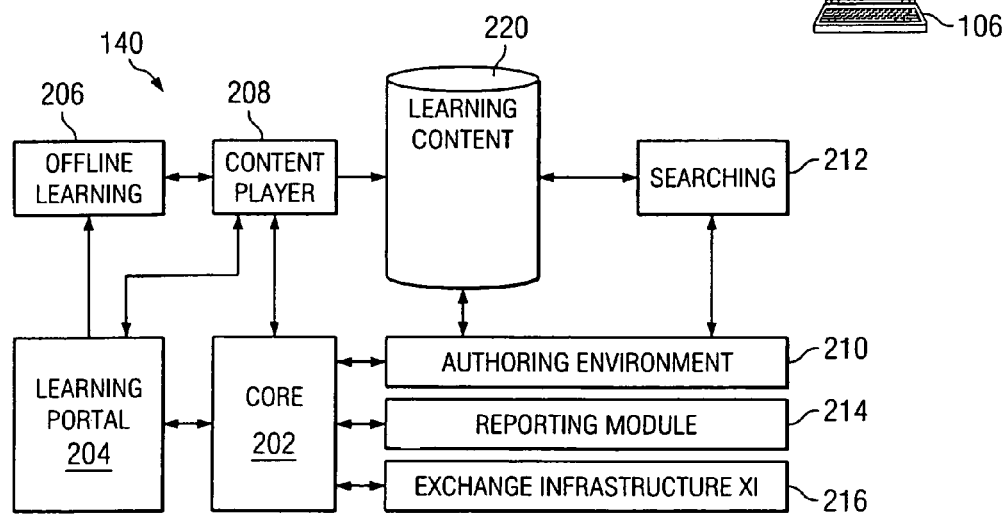
FIG. 2 illustrates an example architecture of a learning management system implemented within the learning environment of FIG. 1.

FIG. 2 illustrates one example implementation of learning management system (LMS) 140. In the illustrated embodiment, LMS 140 comprises four example components, namely i) a management system core 202, which controls learning processes and manages and handles the administrative side of training; ii) a learning portal 204, which is the learner's springboard into the learning environment, which allows him to access the course offering and information on personal learning data and learning activities; iii) an authoring environment 210, where learning content and tests are designed and structured; and iv) a content management system 220, where learning content is stored and managed. Generally, LMS 140 is aimed at learners 104, trainers 105, course authors 106 and instructional designers, administrators, and managers.

Learners 104 log on to their personalized learning portal 204 from any suitable client via GUI 116. The learning portal 204 is the user's personalized point of access to the learning-related functions. Generally, learning portal 204 presents details of the complete education and training offering, such as traditional classroom training, e-learning courses (such as virtual classroom sessions or web-based training), or extensive curricula. Self-service applications enable learners 104 to enroll themselves for courses, prebook for classroom courses, and cancel bookings for delivery methods, as well as start self-paced learning units directly. If learner 104 wants to continue learning offline, he can often download the courses onto the client and synchronize the learning progress later. The learning portal 204 may be seamlessly integrated in an enterprise portal, where learner 104 is provided with access to a wide range of functions via one system. Such an enterprise portal may be the learner's single point of entry and may integrate a large number of role-based functions, which are presented to the user in a clear, intuitive structure. The learning portal 204 often gives learner 104 access to functions such as, for example, search for courses using i) find functions: finding courses in the course catalog that have keywords in the course title or description; and ii) extended search functions: using the attributes appended to courses, such as target group, prerequisites, qualifications imparted, or delivery method. Additional functions may include self-service applications for booking courses and canceling bookings, messages and notes, course appraisals, and special (or personalized) course offering including courses prescribed for the learner 104 on the basis of his or her role in the enterprise or the wishes of the respective supervisor or trainer and qualification deficits of learner 104 that can be reduced or eliminated by participating in the relevant courses. The learning portal 204 may also provide a view of current and planned training activities, as well as access to courses booked, including: i) starting a course; ii) reentering an interrupted course; iii) downloading a course and continuing learning offline; iv) going online again with a downloaded course and synchronizing the learning progress; v) exiting a course; and vi) taking a test.

On the basis of the information the learning management system 140 has about learner 104, the learning management system core 202 proposes learning units for the learner 104, monitors the learner's progress, and coordinates the learner's personal learning process. In addition, the learning management system core 202 is often responsible for managing and handling the administrative processes. Targeted knowledge transfer may use precise matching of the learning objectives and qualifications of a learning unit with the learner's level of knowledge. For example, at the start of a course, the management system core 202 may compare learning objectives already attained by the respective learner 104 with the learning objectives of the course. On the basis of this, core 202 determines the learner's current level and the required content and scope of the course. The resulting course is then presented to the learner 104 via a content player 208.

The content player 208 is a virtual teacher that tailors learning content to the needs of the individual learner 104 and helps him navigate through the course; content player 208 then presents the learning course to the learner 104. In certain embodiments, the content player 208 is a Java application that is deployed on a Java runtime environment, such as J2EE. In this case, it is linked with other systems such as a web application server and ERP solution 135 via the Java Connector. The individual course navigation may be set up at runtime on the basis of the learning strategy stored in the learner account. Using the didactical strategies, content player 208 helps ensure that the course is dynamically adapted to the individual learning situation and the preferences expressed by learner 104. At this point, the content player 208 then calculates dynamically adjusted learning paths and presents these to the learner 104—perhaps graphically—to facilitate orientation within a complex subject area. The learner 104 can resume working on an interrupted course at any time. At this point, the content player 208 guides the learner 104 to the spot at which training was interrupted.

Offline learning player 206 generally enables learners 104 to download network or other web-based courses from the learning portal 204 and play them locally. Locally stored courses are listed in the course list with an icon indicating the status of each course. The offline player 206 may guide the learner 104 through the course according to the preferred learning strategy. It may also dynamically adjust the number and sequence of learning objects to the learner's individual learning pattern. If the learner 104 interrupts a course, the offline player 206 reenters the course at the point of interruption the next time. The learner 104 can, at any point in time, resynchronize his offline learning progress with the learning portal 204 and either continue learning online or set the course to a completed status.

LMS core 202 may also include or invoke training management that would be an administrative side of LMS 140. This typically includes course planning and execution, booking and cancellation of course participation, and follow-up processing, including cost settlement. In training management, the training administrator 105 creates the course offering and can, for example, define training measures for individual learners 104 and groups of learners 104. The training administrator 105 creates the course catalog in training management and makes it available (partially or completely) to learners 104 in the learning portal 204 for reference and enrollment purposes. The training administrator 105 can typically administer internal and external participants and enroll them for courses to be delivered using various technologies and techniques. Training management supports numerous business processes involved in the organization, management, and handling of training. Training management can be configured to meet the requirements, work processes, and delivery methods common in the enterprise. Training measures are usually flexibly structured and may include briefings, seminars, workshops, virtual classroom sessions, web-based trainings, external web-based trainings, static web courses, or curricula. Training management includes functions to efficiently create the course offerings. Using course groups to categorize topics by subject area enables flexible structuring of the course catalog. For example, when training administrator 105 creates a new subject area represented by a course group, he can decide whether it should be accessible to learners 104 in the learning portal 202.

Reporting functions 214 in training management enable managers to keep track of learners' learning activities and the associated costs at all times. Supervisors or managers can monitor and steer the learning processes of their employees. They can be notified when their employees request participation or cancellation in courses and can approve or reject these requests. LMS 140 may provide the training manager with extensive support for the planning, organization, and controlling of corporate education and training. Trainers need to have up-to-the-minute, reliable information about their course schedules. There is a wide range of reporting options available in training management to enable the trainer to keep track of participants, rooms, course locations, and so on.

Authoring environment 210 contains tools and wizards that content developers 106 and instructional designers can use to create or import external course content. External authoring tools can be launched directly via authoring environment 210 to create learning content that can be integrated into learning objects and combined to create complete courses (learning nets). Attributes may be appended to content, thereby allowing learners 104 to structure learning content more flexibly depending on the learning strategy they prefer. Customizable and flexible views allow subject matter experts and instructional designers to configure. and personalize the authoring environment 210. To create the HTML pages for the content, the user can easily and seamlessly integrate editors from external providers or other content providers 108 into LMS 140 and launch the editors directly from authoring environment 210. Authoring environment 210 often includes a number of tools for creating, structuring, and publishing course content and tests to facilitate and optimize the work of instructional designers, subject matter experts, and training administrators 105. Authoring environment 210 may contain any number of components or sub-modules such as an instructional design editor is used by instructional designers and subject matter experts to create and structure learning content (learning nets and learning objects), a test author is used by instructional designers and subject matter experts to create web-based tests, and a repository explorer is for training administrators and instructional designers to manage content.

In the illustrated embodiment, course content is stored and managed in content management system 220. Put another way, LMS 140 typically uses the content management system 220 as its content storage location. But a WebDAV (Web-based Distributed Authoring and Versioning) interface (or other HTTP extension) allows integration of other WebDAV-enabled storage facilities as well without departing from the scope of this disclosure. Content authors or developers 106 publish content in the back-end training management system. Links to this content assist the training administrator 105 in retrieving suitable course content when planning web-based courses. A training management component of LMS 140 may help the training administrator 105 plan and create the course offering; manage participation, resources, and courses; and perform reporting. When planning e-learning courses, the training administrator 105 uses references inserted in published courses to retrieve the appropriate content in the content management system for the courses being planned. Content management system 220 may also include or implement content conversion, import, and export functions, allowing easy integration of Sharable Content Object Reference Model (SCORM)-compliant courses from external providers or other content providers 108. Customers can create and save their own templates for the various learning elements (learning objects, tests, and so on) that define structural and content-related specifications. These provide authors with valuable methodological and didactical support.

Figure 3:
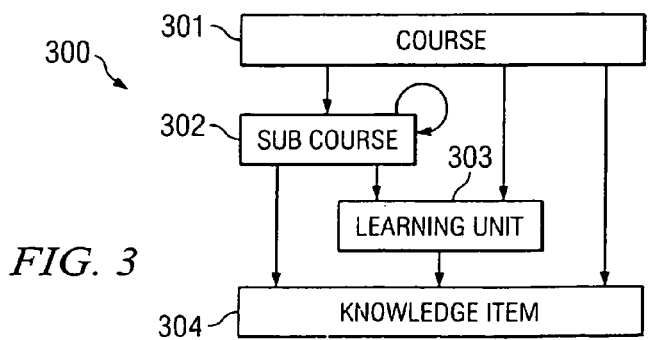
FIG. 3 illustrates an example content aggregation model in the learning management system.

LMS 140 and its implemented methodology typically structure content so that the content is reusable and flexible. For example, the content structure allows the creator of a course to reuse existing content to create new or additional courses. In addition, the content structure provides flexible content delivery that may be adapted to the learning styles of different learners. E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 3, course material 300 may be divided into four structural elements: a course 301, a sub-course 302, a learning unit 303, and a knowledge item 304.

Starting from the lowest level, knowledge items 304 are the basis for the other structural elements and are the building blocks of the course content structure. Each knowledge item 304 may include content that illustrates, explains, practices, or tests an aspect of a thematic area or topic. Knowledge items 304 typically are small in size (i.e., of short duration, e.g., approximately five minutes or less). Any number of attributes may be used to describe a particular knowledge item 304 such as, for example, a name, a type of media, and a type of knowledge. The name may be used by a learning system to identify and locate the content associated with a knowledge item 304. The type of media describes the form of the content that is associated with the knowledge item 304. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

Knowledge item 304 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types are described in further detail below.

Knowledge items 304 may be generated using a wide range of technologies, often allowing a browser (including plug-in applications) to be able to interpret and display the appropriate file formats associated with each knowledge item. For example, markup languages (such as HTML, a standard generalized markup language (SGML), a dynamic HTML (DHTML), or XML), JavaScript (a client-side scripting language), and/or Flash may be used to create knowledge items 304. HTML may be used to describe the logical elements and presentation of a document, such as, for example, text, headings, paragraphs, lists, tables, or image references. Flash may be used as a file format for Flash movies and as a plug-in for playing Flash files in a browser. For example, Flash movies using vector and bitmap graphics, animations, transparencies, transitions, MP3 audio files, input forms, and interactions may be used. In addition, Flash allows a pixel-precise positioning of graphical elements to generate impressive and interactive applications for presentation of course material to a learner.

Learning units 303 may be assembled using one or more knowledge items 304 to represent, for example, a distinct, thematically-coherent unit. Consequently, learning units 303 may be considered containers for knowledge items 304 of the same topic. Learning units 303 also may be considered relatively small in size (i.e., duration) though larger than a knowledge item 304.

Sub-courses 302 may be assembled using other sub-courses 302, learning units 303, and/or knowledge items 304. The sub-course 302 may be used to split up an extensive course into several smaller subordinate courses. Sub-courses 302 may be used to build an arbitrarily deep nested structure by referring to other sub-courses 302.

Courses may be assembled from all of the subordinate structural elements including sub-courses 302, learning units 303, and knowledge items 304. To foster maximum reuse, all structural elements should be self-contained and context free.

Structural elements also may be tagged with metadata that is used to support adaptive delivery, reusability, and search/retrieval of content associated with the structural elements.

For example, learning object metadata (LOM), per maps defined by the IEEE "Learning Object Metadata Working Group," may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 4:
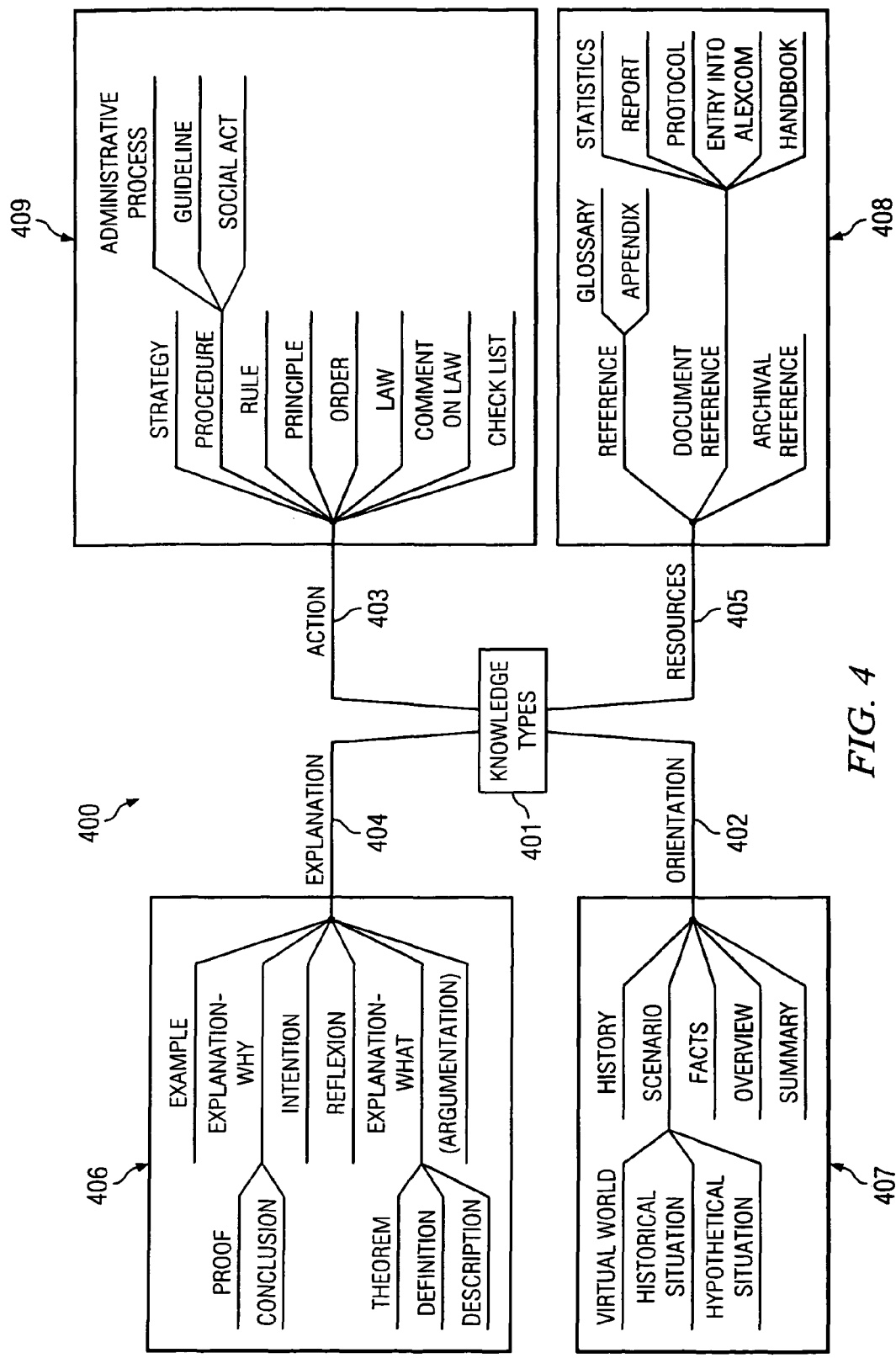
FIG. 4 is an example of one possible ontology of knowledge types used in the learning management system.

As shown in FIG. 4, structural elements may be categorized using a didactical ontology 400 of knowledge types 401 that includes orientation knowledge 402, action knowledge 403, explanation knowledge 404, and resource knowledge 405. Orientation knowledge 402 helps a learner 104 to find their way through a topic without being able to act in a topic-specific manner and may be referred to as "know what." Action knowledge 403 helps a learner to acquire topic related skills and may be referred to as "know how." Explanation knowledge 404 provides a learner with an explanation of why something is the way it is and may be referred to as "know why." Resource knowledge 405 teaches a learner where to find additional information on a specific topic and may be referred to as "know where."

The four knowledge types (orientation, action, explanation, and reference) may be further divided into a fine grained ontology. For example, orientation knowledge 402 may refer to sub-types 407 that include a history, a scenario, a fact, an overview, and a summary. Action knowledge 403 may refer to sub-types 409 that include a strategy, a procedure, a rule, a principle, an order, a law, a comment on law, and a checklist. Explanation knowledge 404 may refer to sub-types 406 that include an example, an intention, a reflection, an explanation of why or what, and an argumentation. Resource knowledge 405 may refer to sub-types 408 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B" describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 304 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 302 or a learning unit 303. The competencies may be used to indicate and evaluate the performance of a learner as learner 104 traverses the course material. A competency may be classified as a cognitive skill, an emotional skill, a senso-motorical skill, or a social skill.

Figure 6A:
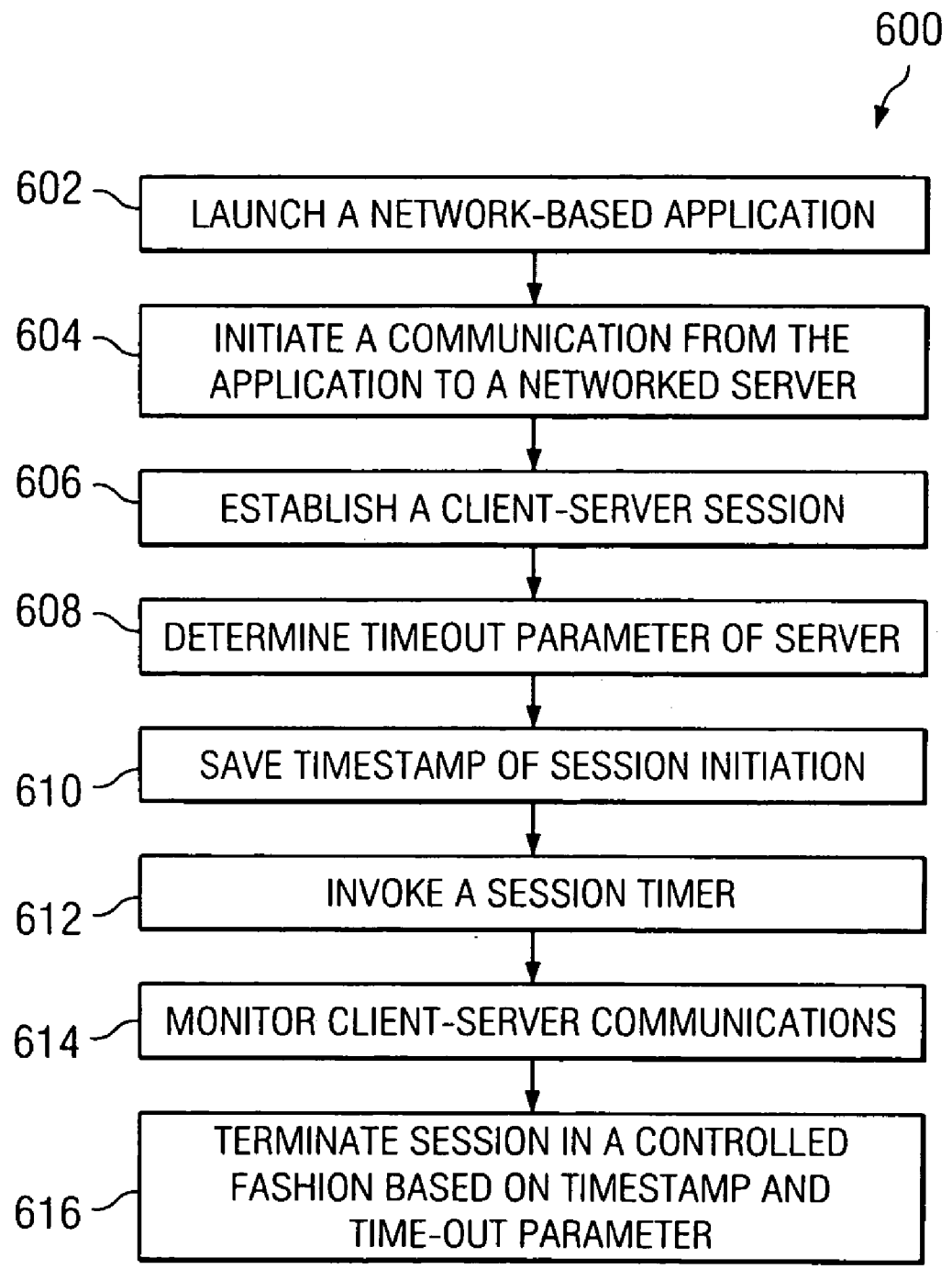
FIG. 6 are flow diagrams illustrating example methods for time-out handling according to one embodiment of the present disclosure.
Figure 6B:
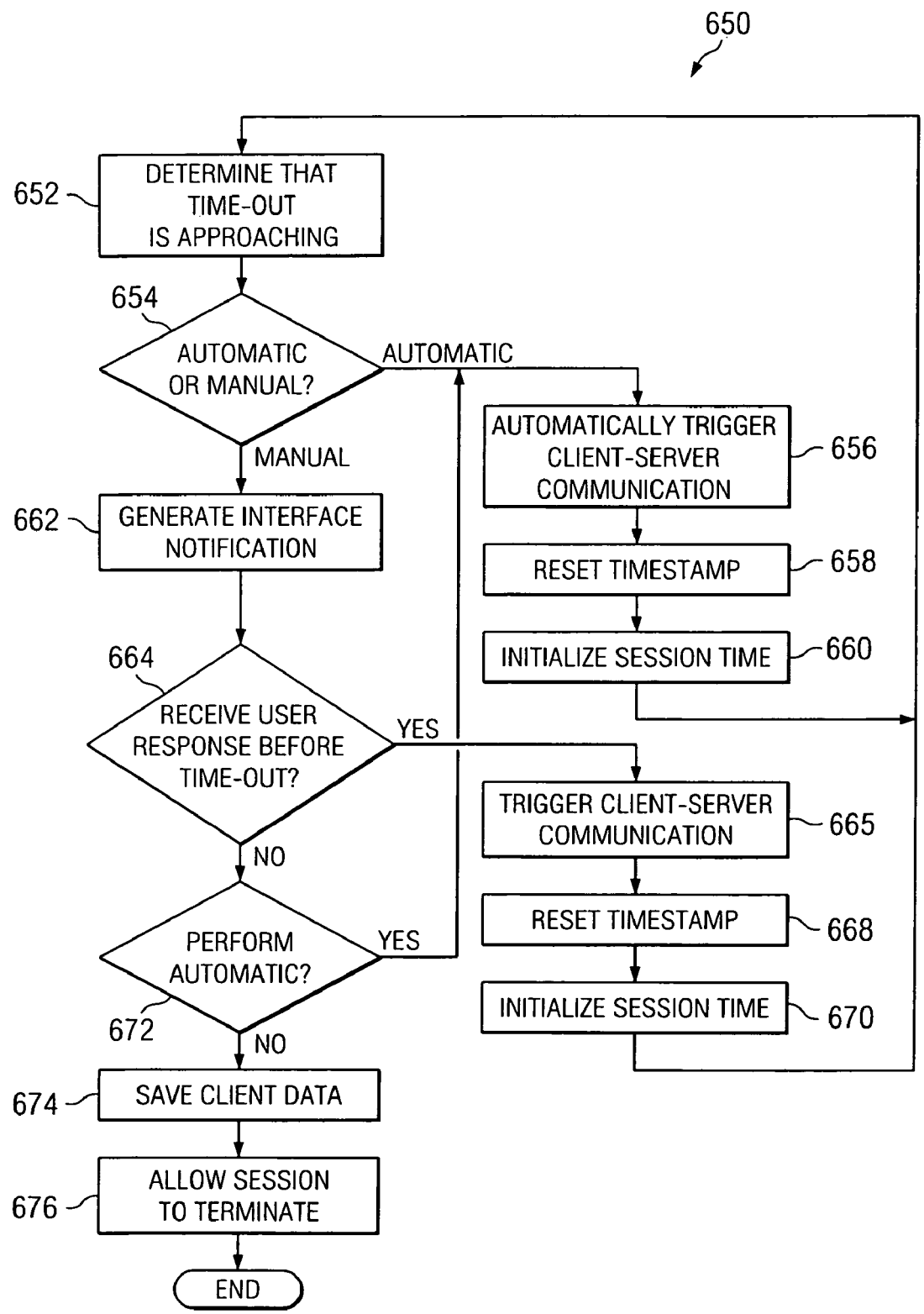

FIGS. 6A-B are flowcharts illustrating example methods, 600 and 650 respectively, for time-out handling in accordance with certain embodiments of the present disclosure. Generally, the following description focuses on the operation of the client within learning management system 140, perhaps using GUI 116 or content player 208, to perform these methods. Moreover, any reference to a particular implementation of the network-based application is meant to include the use of an API or other similar software or interface. But environment 100 contemplates using any appropriate combination and arrangement of logical elements implementing some or all of the described functionality. Indeed, any suitable environment, system, or component may implement the following or other similar techniques.

Method 600 generally describes managing time-outs of a particular client-server session. At step 602, a network-based application is launched. This launch may occur automatically from a request of learning management system 140, based a request from learner 104 (perhaps executing content player 208), or in response to any other event. For any suitable reason, a communication is initiated at step 604 from the network-based application (again, such as browser 116 or learning content player 208). A client-server session is then established at step 606. Network-based application, or an API invoked or referenced by it, determines a time-out parameter of server 102 at step 608. Such a time-out parameter may be stored in any suitable data structure and identified using any appropriate technique. For example, the time-out parameter may be stored in a config.web file and called timeout. In another example, the time-out parameter may be stored in an XML file, say web.xml, in the following format: <session-timeout>30</session-timeout>. In a further example, the time-out parameter may be an attribute stored in a session object, such as var $timeout. In yet another example, the time-out parameter may comprise a Java variable such as MaxInactiveInterval. Of course, these are only example and are a subset of the number of different ways that server 102, or the particular web application on it, stores the time-out information. Indeed, there may be a plurality of functions or techniques for retrieving such time-out information for each particular time-out structure or format. Then, at step 610, the application saves a timestamp of the session establishment. It will be understood that the timestamp may be stored in local memory, used to populate a run-time data structure, or kept for subsequent use using any available technique. Moreover, this timestamp may be associated with the client's request, the server's response or confirmation, the generation of the first context information, or any other suitable time. At step 612, a session timer is invoked. This session timer may be a subroutine, a standalone module, a process, a method, or any other logic operable to track, at least, time. For any suitable length of time or based on dynamic parameters, client-server communications are monitored to help ensure that server 102 does not terminate the session without confirmation or allowance by the client or the network-based application. When it is deemed allowable, necessary, or that a rule was triggered, then the session is terminated, often if a controlled fashion based on the timestamp ad the time-out parameter.

Method 650 provides certain example details on monitoring client-server communications and prohibiting time-outs unless it is desired or falls with proscribed rules. For example, at step 652, the network-based application, or any appropriate API or sub-module, determines that a time-out is approaching. Such a determination may be relative to the particular implementation, based on the timeout parameter of server 102, or be based on any other appropriate algorithmic calculation. For example, if the time-out parameter is 30 minutes, then it may be a rule (whether in the software or in a policy) that the time-out is considered near at 25 minutes. But if the timeout parameter is 5 minutes, then the actual time-out may be considered near at 4 minutes and 30 seconds. Moreover, the determination may be based on the particular time of day (such as lunch time, working hours, and such), local time, location (such as local or remote to a particular enterprise), user role, data being accessed or requested (confidential or public information), or any other variable or technique. For example, learning management system 140 may allow for longer time-outs during lunch hours, but shorter time-outs during night hours because of the higher probability that the user has left for the day. Regardless of the particular implementation, once the session time-out nears, it is determined at decisional step 654 whether learning management system 140 should automatically keep the session alive or if it should request confirmation for the user before proceeding. This determination may also be based on a policy, on run-time parameters, or according to any other intelligence or data. If the network-based application determines that it should automatically keep the session alive, then it triggers a client-server communication. This communication is often hidden from the user and uses little processing or bandwidth. For example, this communication may a ping( ), a request for time at server 102, a request for the date at server 102, a servlet function, a SCORM method, a request to identify server 102, or any other suitable command or request. The network-based application may determine the particular command based on the particular environment settings or other data. After this automatic communication, the network-based application resets and save the timestamp at step 660. Once the session time-out has been renewed, network-based application may continue to monitor the session for further time-out handling, so the processing returns step 652. In certain embodiments, the application may keep track of a counter to limit the number of automatic time-out renewals and then either allow the session to terminate or present a manual option.

Figure 5A:
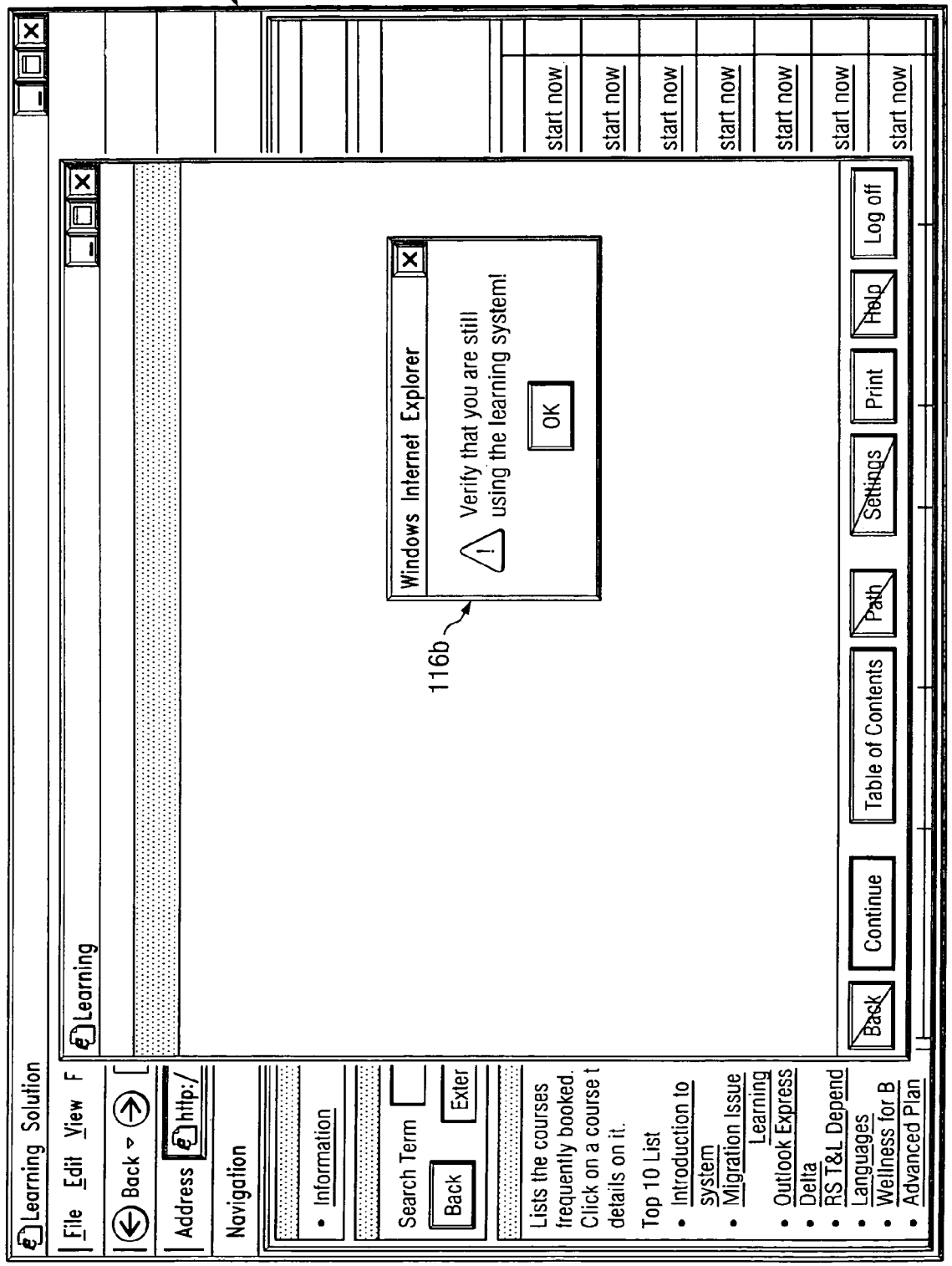
FIGS. 5A-B provide example interface views involving time-out handling that may be implemented within the environment of FIG. 1.
Figure 5B:
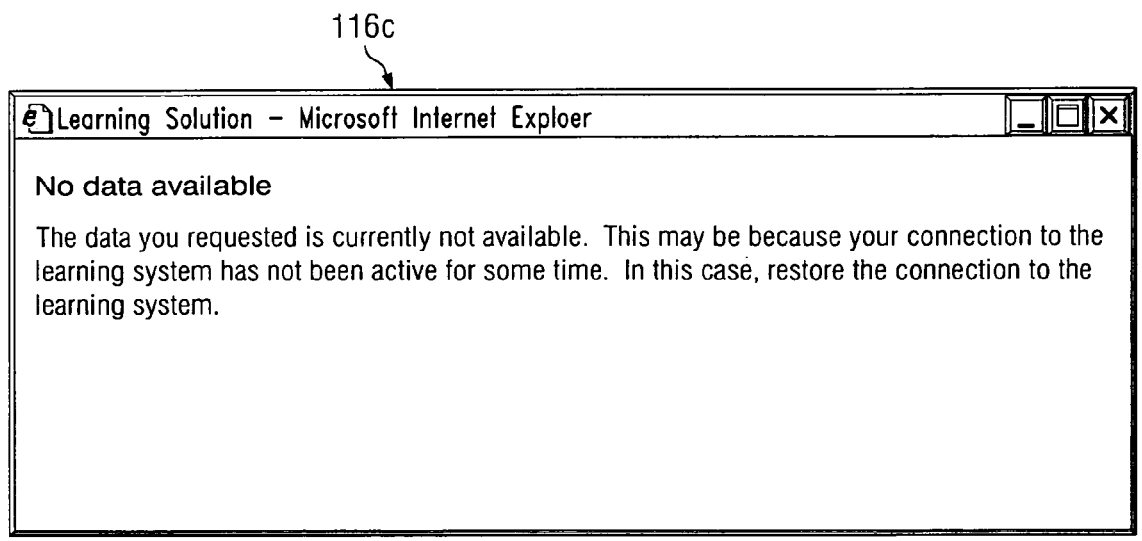

If the network-based application determines that manual confirmation if preferred or required at decisional step 654, then the network-based application (such as content player 208) may generate and present an interface notification such as, for example, a pop-up window (116b as illustrated in FIG. 5A), an interactive instant message, or other such event at step 662. If the user responds to the notification, such as by pressing or selecting the appropriate button, before the time-out (as shown by decisional step 664), then the application triggers a client-server communication at step 665. As above, this communication is often hidden from the user and uses little processing or bandwidth. After this communication, the network-based application resets and save the timestamp at step 668. Once the session time-out has been renewed, network-based application may continue to monitor the session for further time-out handling, so the processing returns step 652. If the user has not responded within an appropriate timeframe (such as 5 or 10 seconds before the session is to be terminated), then the application determines if it is supposed to automatically keep the session alive regardless at decisional step 672. If it is, then processing returns to step 656. Otherwise, the application attempts to bring the session down in a controlled manner. For example, at step 674, it may save the client data to allow for subsequent recovery 674. Then, the network-based application allows server 102 to terminate the session at step 676 (and may notify the user via example notification 116c as illustrated in FIG. 5B).

The preceding flowcharts and accompanying descriptions illustrate exemplary methods 600 and 650. But environment 100 contemplates using any suitable technique for performing these and other tasks. Accordingly, many of the steps in these flowcharts may take place simultaneously and/or in different orders than as shown. Moreover, environment 100 may use methods with additional steps, fewer steps, and/or different steps, so long as the methods remain appropriate. For example, it will be understood that the client may execute portions of the processes described in methods 600 and 650 in parallel or in sequence.

A number of embodiments have been described. Nevertheless, it will be understood that various modifications may be made without departing from the spirit and scope of the disclosure. For example, while described herein as being implemented in a learning management system, the components and techniques may be used any similar or dissimilar application, module, or web service. Moreover, it is not required that the client and server reside within the same environment, system, or network, as described. Indeed, the particular client and the particular server may be unrelated either logically or physically (beyond some connection) and reside in different parts of the globe. Accordingly, other embodiments are within the scope of the following claims.

What is claimed is:

1. A computer-implemented method for time-out handling, the method steps performed by one or more processors and comprising:

establishing a session from a network-based application at a client to a web server;

identifying a time-out parameter of the web server;

saving a timestamp of the established session at the client;

determining a first time-out by adding the identified time-out parameter to the timestamp;
triggering a system-based communication from the network-based application that maintains the session alive between the web server and the client;
automatically resetting the timestamp based on the triggered communication that maintains the session alive;
incrementing, by the one or more processors, a counter in response to triggering the system-based communication connection with at least resetting the timestamp, the counter identifies a number of system-based communications transmitted from the network-based application at the client to the web server that maintained the session alive;
continuing to trigger system-based communications to keep the session alive until the counter reaches a threshold number for maintaining the session alive using the system-based communication; and
after the threshold number is reached, presenting an interactive notification to a user of the network-based application of a time-out approaching and triggering the system-based communications after the user interfaces with the system-based communication;
wherein presenting the notification comprises presenting the notification if the timestamp falls within a certain timeframe;
saving recovery data prior to a subsequent time-out.

2. The method of claim 1, the network-based application comprising a learning content player.

3. The method of claim 2, the learning content player comprising a client of a learning management system, which further includes the web server, and the client comprising a timer API operable to track time between communications.

4. The method of claim 1, wherein continuing to trigger system-based communications comprises continuing to trigger system-based communications within a certain timeframe.

5. The method of claim 1, the triggered system-based communication comprising one of the following:
a ping;
a servlet function;
a SCORM method;
a request to identify the web server; or
a request for a time at the webserver.

6. A computer program product comprising instructions embodied in a non-transitory machine-readable tangible medium for time-out handling, the instructions operable to cause one or more data processing apparatus to perform operations comprising:
establishing a session from a network-based application at a client to a web server;
identifying a time-out parameter of the web server;
saving a timestamp of the established session at the client;
determining a first time-out by adding the identified time-out parameter to the timestamp;
triggering a system-based communication from the network-based application that maintains the session alive;
incrementing a counter in response to triggering the system-based communication, the counter identifies a number of system-based communications transmitted from the network-based application at the client to the web server that maintained the session alive;
continuing to trigger system-based communications to keep the session alive until the counter reaches a threshold number for maintaining the session alive using the system-based communication;
determining if a time-out of the web server is approaching;
after the threshold number is reached, presenting an interactive notification to a user of the network-based application of a time-out approaching and triggering the system-based communication after the user interfaces with the system-based communication;
wherein presenting the notification comprises presenting the notification if the timestamp falls within a certain timeframe;
saving recovery data prior to the time-out.

7. The computer program product of claim 6, the network-based application comprising a learning content player.

8. The computer program product of claim 7, the learning content player comprising a client of a learning management system, which further includes the web server.

9. The computer program product of claim 6, wherein the operations to continue to trigger system-based communications comprises triggering system-based communications within a certain timeframe.

10. The computer program product of claim 6, the triggered system-based communication comprising one of the following:
a ping;
a servlet function;
a SCORM method;
a request to identify the web server; or
a request for a time at the webserver.

11. A system for time-out handling, comprising:
memory storing a network-based application; and
one or more processors operable to:
establish a session from a network-based application at a client to a web server;
identify a time-out parameter of the web server;
store a timestamp of the established session in memory;
determine a first time-out by adding the identified time-out parameter to the timestamp; and
trigger a system-based communication from the network-based application that maintains the session alive between the web server and the client;
automatically reset the timestamp based on the triggered system-based communication that maintains the session;
increment a counter in response to the triggered system-based communication, the counter identifies a number of system-based communications transmitted from the network-based application at the client to the web server that maintained the session alive; and
continue to trigger system-based communications with the web server to keep the session alive until the counter reaches a threshold number for maintaining the session alive using the system-based communication;
present an interactive notification, after the threshold number is reached, to a user of the network-based application of a time-out approaching and triggering the system-based communication after the user interfaces with the system-based communication;
wherein presenting the notification comprises presenting the notification if the timestamp falls within a certain timeframe;
save recovery data prior to a subsequent time-out.

12. The system of claim 11, the network-based application comprising a learning content player.

13. The system of claim 12, the learning content player comprising a client of a learning management system, which further includes the web server.

14. The system of claim 11, wherein the one or more processors operable to continue to trigger system-based communications comprises one or more processors operable to trigger system-based communications within a certain timeframe.

15. The system of claim 11, the triggered system-based communication comprising one of the following:
  a ping;
  a servlet function;
  a SCORM method;
  a request to identify the web server; or
  a request for a time at the webserver.

* * * * *